US009906106B1

(12) United States Patent
Linares

(10) Patent No.: US 9,906,106 B1
(45) Date of Patent: Feb. 27, 2018

(54) ELECTRICAL GENERATOR OR MOTOR WITH VARIABLE COIL WINDING PATTERNS EXHIBITING MULTIPLE WIRES INCORPORATED INTO A PLURALITY COIL CONFIGURATIONS DEFINED AROUND A ROTOR AND INCORPORATING A GEARBOX ARRANGEMENT EXHIBITING OPPOSITELY DRIVEN ROTOR AND STATOR GEARS CONFIGURED WITH MULTI-TIERED REVERSING GEARS EXHIBITING BOTH STRAIGHT AND HELICAL PATTERNS AND FOR VARYING TURNING RATIOS FOR ESTABLISHING EITHER OF ACCELERATION OR DECELERATION ASPECTS FOR INCREASED POWER OUTPUT

(71) Applicant: MAESTRA ENERGY, LLC, Auburn Hills, MI (US)

(72) Inventor: Miguel A. Linares, Bloomfield Hills, MI (US)

(73) Assignee: MAESTRA ENERGY, LLC, Auburn Hills, MI (US)

( * ) Notice: Subject to any disclaimer, the term of this patent is extended or adjusted under 35 U.S.C. 154(b) by 557 days.

(21) Appl. No.: 14/608,974

(22) Filed: Jan. 29, 2015

Related U.S. Application Data

(60) Provisional application No. 61/934,132, filed on Jan. 31, 2014.

(51) Int. Cl.
*H02K 16/02* (2006.01)
*H02K 16/00* (2006.01)
(Continued)

(52) U.S. Cl.
CPC ............. *H02K 16/005* (2013.01); *H02K 3/04* (2013.01); *H02K 7/116* (2013.01); *H02K 13/006* (2013.01);
(Continued)

(58) Field of Classification Search
CPC .. H02K 3/04; H02K 3/30; H02K 3/32; H02K 3/325; H02K 3/34; H02K 3/345;
(Continued)

(56) References Cited

U.S. PATENT DOCUMENTS 2,097,286 A * 10/1937 McGee ...................... E03B 9/00
290/54
2,696,585 A * 12/1954 Vermillion ........... H02K 16/025
310/118

(Continued)

FOREIGN PATENT DOCUMENTS

FR        2995743 A1    3/2014
GB       191513481 A    9/1916
(Continued)

*Primary Examiner* — Bernard Rojas
*Assistant Examiner* — Alexander Singh
(74) *Attorney, Agent, or Firm* — Dinsmore & Shohl LLP

(57) ABSTRACT

An induction motor or generator assembly for converting either of an electrical input or rotating work input to a mechanical/rotating work or electrical output. An outer annular arrayed component is rotatable in a first direction and includes a plurality of magnets arranged in a circumferentially extending and inwardly facing fashion according to a first perimeter array, the outer component further incorporating a rotating shaft projecting from a central location. An inner concentrically arrayed and reverse rotating component exhibits a plurality of outwardly facing and circumferentially spaced array of coil-subassemblies opposing the magnetic elements, such that a gap separates the coil-subassemblies from the magnets. The coil sub-assemblies each include a plurality of concentrically arrayed coils
(Continued)

configured within a platform support of the inner component. A plurality of stacked commutator segments each have a plurality of annular extending and individually insulated segments arranged in exteriorly facing manner.

17 Claims, 5 Drawing Sheets

(51) Int. Cl.
  *H02K 23/60*  (2006.01)
  *H02K 7/116*  (2006.01)
  *H02K 17/12*  (2006.01)
  *H02K 3/04*  (2006.01)
  *H02K 13/00*  (2006.01)
  *H02K 13/10*  (2006.01)
  H02K 1/27  (2006.01)
  H02K 3/32  (2006.01)

(52) U.S. Cl.
  CPC ............ *H02K 13/10* (2013.01); *H02K 16/00* (2013.01); *H02K 16/02* (2013.01); *H02K 16/025* (2013.01); *H02K 17/12* (2013.01); *H02K 23/60* (2013.01); *H02K 1/2786* (2013.01); *H02K 3/32* (2013.01)

(58) Field of Classification Search
  CPC .......... H02K 3/52; H02K 3/521; H02K 3/522; H02K 3/524; H02K 3/525; H02K 23/60; H02K 16/005; H02K 16/02; H02K 16/025; H02K 16/00; H02K 16/04; H02K 5/14; H02K 5/141; H02K 5/143; H02K 5/145; H02K 5/146; H02K 5/148; H02K 1/2786; H02K 1/24; H02K 7/116; H02K 7/1163
  USPC ................ 310/179, 180, 189, 198, 216.005, 310/216.022, 216.024, 216.026, 216.027, 310/216.028, 216.029, 216.033, 216.036, 310/216.037, 234, 65, 194, 208, 216.019, 310/121, 83, 99, 115
  See application file for complete search history.

(56) References Cited

U.S. PATENT DOCUMENTS

| | | |
|---|---|---|
| 4,456,858 A | 6/1984 | Loven |
| 4,663,536 A | 5/1987 | Roesel, Jr. et al. |
| 5,159,222 A | 10/1992 | Southall |
| 5,631,513 A | 5/1997 | Coles et al. |
| 6,034,460 A | 3/2000 | Tajima et al. |
| 6,049,152 A | 4/2000 | Nakano |
| 7,180,219 B2 | 2/2007 | Xu |
| 7,843,102 B1 | 11/2010 | Wyremba |
| 7,928,624 B2 | 4/2011 | Huppunen et al. |
| 7,965,011 B2 | 6/2011 | Liao |
| 8,084,912 B2 | 12/2011 | Mizushima |
| 8,106,558 B2 | 1/2012 | Yamamoto |
| 8,247,943 B2 | 8/2012 | Prucher |
| 8,247,944 B2 | 8/2012 | Gebregergis et al. |
| 8,344,572 B2 | 1/2013 | Moellgaard et al. |
| 8,482,179 B2 | 7/2013 | Nakamura et al. |
| 8,541,921 B2 | 9/2013 | Jang et al. |
| 8,552,609 B2 | 10/2013 | Nishiyama |
| 8,844,659 B2 | 9/2014 | Pieralisi |
| 2004/0256941 A1 | 12/2004 | Yoneda et al. |
| 2005/0017591 A1 | 1/2005 | Brewster et al. |
| 2006/0103252 A1 | 5/2006 | Yokota |
| 2007/0096580 A1 | 5/2007 | Ketteler |
| 2008/0174195 A1 | 7/2008 | Tupper et al. |
| 2008/0296992 A1 | 12/2008 | Militzer |
| 2009/0021098 A1 | 1/2009 | Takeuchi |
| 2009/0072645 A1* | 3/2009 | Quere .................... H02K 7/116 310/114 |
| 2009/0289512 A1 | 11/2009 | Prucher |
| 2010/0013335 A1 | 1/2010 | Strube |
| 2010/0060097 A1 | 3/2010 | Peterson |
| 2010/0244611 A1 | 9/2010 | Akutsu et al. |
| 2010/0289348 A1* | 11/2010 | Gruendl .................. H02K 9/22 310/54 |
| 2011/0057534 A1 | 3/2011 | Goda |
| 2011/0298310 A1 | 12/2011 | Ross et al. |
| 2012/0161566 A1 | 6/2012 | Ikuta et al. |
| 2012/0235528 A1 | 9/2012 | Axford |
| 2013/0123057 A1 | 5/2013 | Markl |
| 2013/0127287 A1 | 5/2013 | Stephenson |
| 2013/0147311 A1* | 6/2013 | Li .......................... H02K 23/00 310/232 |
| 2013/0214541 A1 | 8/2013 | Kamper et al. |
| 2013/0214632 A1 | 8/2013 | Muniz Casais et al. |
| 2013/0237361 A1 | 9/2013 | Palfai et al. |
| 2014/0197709 A1 | 7/2014 | Hasegawa |
| 2014/0368093 A1* | 12/2014 | Valenti ................... H02P 25/18 310/68 B |
| 2014/0375164 A1 | 12/2014 | Deak et al. |

FOREIGN PATENT DOCUMENTS

| | | |
|---|---|---|
| GB | 501432 A | 2/1939 |
| GB | 762078 A | 11/1956 |
| JP | 3057913 U | 6/1999 |
| JP | 2007529988 A | 10/2007 |
| JP | 2012044842 A | 3/2012 |
| JP | 2012515520 A | 7/2012 |
| JP | 5550829 B2 | 7/2014 |
| WO | 0118940 A2 | 3/2001 |
| WO | 2012017302 A1 | 2/2012 |

* cited by examiner

US 9,906,106 B1

ELECTRICAL GENERATOR OR MOTOR WITH VARIABLE COIL WINDING PATTERNS EXHIBITING MULTIPLE WIRES INCORPORATED INTO A PLURALITY COIL CONFIGURATIONS DEFINED AROUND A ROTOR AND INCORPORATING A GEARBOX ARRANGEMENT EXHIBITING OPPOSITELY DRIVEN ROTOR AND STATOR GEARS CONFIGURED WITH MULTI-TIERED REVERSING GEARS EXHIBITING BOTH STRAIGHT AND HELICAL PATTERNS AND FOR VARYING TURNING RATIOS FOR ESTABLISHING EITHER OF ACCELERATION OR DECELERATION ASPECTS FOR INCREASED POWER OUTPUT

CROSS REFERENCE TO RELATED APPLICATIONS

This Application claims the benefit of U.S. Provisional Application 61/934,132 filed on Jan. 31, 2014, the contents of which is incorporated herein in its entirety.

FIELD OF THE INVENTION

The present invention relates generally to electrical generators and motors and, more specifically, AC induction generator and motor assemblies for converting an electrical input to a rotating work output. More specifically, the present invention discloses an electrical induction generator or motor exhibiting redesigned stator and rotor components which are reconfigured as outer and inner annular components constructed to rotate in opposite directions during operation and for optimizing work output of the rotating shaft, this further including the integration of multi-tiered variants of a gear assembly incorporating oppositely driven rotor and stator supported gears, via straight and helically configured variants of stacked reversing gears, according to any rotating speed ratio (including accelerating/decelerating applictaions) and in order to increase work output (i.e. either enhanced rotation of the shaft in an electric motor mode or increased current output in an electric generator mode).

BACKGROUND OF THE INVENTION

In electricity generation, an electric generator is a device that converts mechanical energy to electrical energy. A generator forces electric current to flow through an external circuit. As is further known, the source of mechanical energy may be a reciprocating or turbine steam engine, water falling through a turbine or waterwheel, an internal combustion engine, a wind turbine, a hand crank, compressed air, or any other source of mechanical energy. In practical applications, generators provide nearly all of the power for electric power grids.

As is further known, the reverse conversion of electrical energy into mechanical energy is done by an electric motor, and motors and generators have many similarities. Many motors can be mechanically driven to generate electricity and frequently make acceptable generators.

Electrical generators and motors (such as of the AC induction or DC variety) typically include an outer stator (or stationary component) which is usually shaped as a hollow cylinder containing copper wires which are wound or otherwise configured within the inner facing wall. In a motor configured application, electricity flowing into selected pairs of coils configured within the stator (a three phase motor typically includes three individual pairs of coils which are arranged in opposing and partially circumferentially offsetting fashion) results in rotation of an interiorly positioned rotor component.

The rotor is usually shaped as a solid cylinder that sits inside the stator (with a defined air gap between the outer cylindrical surface of the rotor and the inner cylindrical surface of the stator) with an output shaft extending from an axial centerline of the rotor. The rotor further includes a series of highly conductive elements (such as aluminum rods) embedded within its outer surface.

In an electric motor driving application, a separate current is fed to the rods via a commutator which is a mechanism used to switch the input of certain AC and DC machines and which usually includes a plurality of slip ring segments insulated from each other and from the rotor shaft. An armature current is supplied through a plurality of brushes (these typically being arranged in a stationary fashion in the prior art) and which are arranged in contact with the rotor supported and revolving commutator, this causing a required current reversal for applying power to the motor in an optimal manner as the rotator rotates from pole to pole (it being noted that the absence of such current reversal would result in the motor braking to a stop).

The stator simulates motion by switching applied current in an overlapping fashion (via the partially overlapping and circumferentially offset sets of coils integrated into the stator inner cylindrical wall). As is further known, the magnetic force created in the stator by energizing the wires or coils is opposed by the armature current supplied rods embedded within the rotor, such that the force of the magnetic field generated in the stator in the multi-phase (staged) fashion results in the driving the current in the rotor supported rods (and therefore the rods and rotor as well) at a right angle to the magnetic field induced, thereby rotating the magnetically suspended (air gap supported) rotor and output shaft at a desired speed without the necessity of any moving components.

In this fashion, magnetic fields are formed in both the rotor and the stator, with the product of these giving rise to the force generated driving torque applied to the (typically inner concentrically supported) rotor. As is further understood, one or both of these magnetic fields (as explained further by Faraday's Law and associated Lorentz Forces Law) must be made to change with the rotation of the motor, such as accomplished by switching the poles on and off at the correct time intervals or by varying the strengths of the poles.

Additional variations of more recent AC electric motors further include either synchronous or asynchronous motors (this again being based upon the speed of rotation of the magnetically generated field under Faraday's Law). In particular, a synchronous electric motor is an AC motor distinguished by a rotor spinning with coils passing magnets at the same rate as the AC and resulting magnetic field which drives it (i.e. exhibiting zero slip under typical operating conditions). In contrast, induction style motors must slip to produce torque and which operate under the principle of inducting electricity into the rotor by magnetic induction (as opposed to by direct electrical connection).

Additional known features include a commutator which is defined as a mechanism used to switch the input of certain AC and DC machines and consisting of slip ring segments insulated from each other and from the electric motor's shaft. In this application, the motor's armature current is supplied through an arrangement of stationary brushes in contact with the (typically) revolving commutator, which causes the required current reversal and applies power to the machine in an optimal manner as the rotor rotates from pole to pole.

Building upon the above explanation, and in an alternate generator application, the rotary shaft is again the input of the rotation by means of an outside work source and, upon being rotated, the configuration of the above-described coils passes by the magnets to create an electrical charge (or field) that becomes the output power variable. An induction generator or asynchronous generator is a type of AC electrical generator that uses the principles of induction motors to produce power.

Induction generators operate by mechanically turning their rotor faster than the synchronous speed, giving negative slip. A regular AC asynchronous motor usually can be used as a generator, without any internal modifications. Induction generators are useful in applications such as mini-hydro power plants, wind turbines, or in reducing high-pressure gas streams to lower pressure, because they can recover energy with relatively simple controls. To operate an induction generator must be excited with a leading voltage; this is usually done by connection to an electrical grid, or sometimes they are self-excited by using phase correcting capacitors.

Other known generator applications include a dynamo which is an electrical generator that produces direct current with the use of a commutator. Dynamos were the first electrical generators capable of delivering power for industry, and the foundation upon which many other later electric-power conversion devices were based, including the electric motor, the alternating-current alternator, and the rotary converter.

Features associated with the commutator include it comprising the moving part of a rotary electrical switch in certain types of electric motors or electrical generators that periodically reverses the current direction between the rotor and the external circuit. Commutators typically have two or more softer (fixed) metallic brushes in contact with them to complete the other half of the switch. In a motor, it applies power to the best location on the rotor, and in a generator, picks off power similarly. As a switch, it has exceptionally long life, considering the number of circuit makes and breaks that occur in normal operation.

Expanding on the above explanation, and as is further known, a commutator consists of a set of copper segments, fixed around the part of the circumference of the rotating machine, or the rotor, and a set of spring loaded brushes fixed to the stationary frame of the machine. Two (or more) fixed brushes connect to the external circuit, either a source of current for a motor or a load for a generator.

Each conducting segment on the armature of the commutator is insulated from adjacent segments through the use of an appropriate material. Many other insulating materials are used to insulate smaller machines; plastics allow quick manufacture of an insulator, for example. In other applications, the segments are held onto the shaft using a dovetail shape on the edges or underside of each segment, using insulating wedges around the perimeter of each commutation segment.

As is further known in the art, a commutator is also a common feature of direct current rotating machines. By reversing the current direction in the moving coil of a motor's armature, a steady rotating force (torque) is produced. Similarly, in a generator, reversing of the coil's connection to the external circuit provides unidirectional (i.e. direct) current to the external circuit.

Without a commutator, a dynamo becomes an alternator, which is a synchronous singly fed generator. Alternators produce alternating current with a frequency that is based on the rotational speed of the rotor and the number of magnetic poles.

Automotive alternators produce a varying frequency that changes with engine speed, which is then converted by a rectifier to DC. By comparison, alternators used to feed an electic power grid are generally operated at a speed very close to a specific frequency, for the benefit of AC devices that regulate their speed and performance based on grid frequency. When attached to a larger electric grid with other alternators, an alternator will dynamically interact with the frequency already present on the grid, and operate at a speed that matches the grid frequency.

Typical alternators use a rotating field winding excited with direct current, and a stationary (stator) winding that produces alternating current. Since the rotor field only requires a tiny fraction of the power generated by the machine, the brushes for the field contact can be relatively small. In the case of a brushless exciter, no brushes are used at all and the rotor shaft carries rectifiers to excite the main field winding.

The armature component of the device must carry current so it is always a conductor or a conductive coil which is oriented normal to both the field and to the direction of motion, torque (rotating machine), or force (linear machine). The armature's role is twofold, the first being to carry current crossing the field, thus creating shaft torque in a rotating machine or force in a linear machine (e.g. motor mode), the second role being to generate an electromotive force (EMF).

In the armature, an electromotive force is created by the relative motion of the armature and the field. When the machine acts in the motor mode, this EMF opposes the armature current, and the amiature converts electrical power to mechanical torque, and power, unless the machine is stalled, and transfers it to the load via the shaft.

When the machine acts in the generator mode, the armature EMF drives the armature current, and shaft mechanical power is converted to electrical power and transferred to the load. In an induction generator, these distinctions are blurred, since the generated power is drawn from the stator, which would normally be considered the field.

Applications of electro-magnetic motor and generator assemblies in the patent art include the permanent magnet motor generator set of Strube, US 2010/0013335, which teaches a method of utilizing unbalanced non-equilibrium magnetic fields to induce a rotational motion in a rotor, the rotor moves with respect to the armature and stator. A three tier device (armature, rotor, and stator) has the armature and stator being fixed in position with the rotor allowed to move freely between the armature and stator.

To induce a rotational motion, the rotor, in its concave side uses unbalanced non-equilibrium magnetic fields created by having multiple magnets held in a fixed position by ferritic or like materials to act upon the magnets imbedded in the armature. The rotor, in its convex side has additional unbalanced non-equilibrium magnets and additional pole pair magnets to create a magnetic flux that moves with the moving fixed position fields to cut across closely bonded coils of wire in the stator to induce a voltage and current that is used to generate electrical power. Multiple permanent magnets of varying strength are geometrically positioned in multiple groups to produce a motive power in a single direction with the remainder of the unbalanced magnetic flux positioned and being used to cut across the coils of wire to produce continuous electric power.

Hasegawa, US 2014/0197709, teaches an assembly conducting wire for a rotary electric machine winding which includes a plurality of bundled wires, these being twisted in a circumferential direction, with the wires being welded together at a predetermined distance. US 2007/0096580, to Ketteler, teaches a stator for a three phase current electric machine such as for motor vehicles and which consists of a winding support having grooves and teeth. The windings are arranged in the grooves and the winding support consists of a plurality of identical segments which, after being wound, are shaped into a circular ring. The segments are then inserted into a cylindrical housing and, with their windings, form the cylindrical stator.

Liao, U.S. Pat. No. 7,965,011, teaches a brushless DC motor structure with a constant ratio of multiple rotor poles to slots of the stator and which is characterized primarily by forming the stator of the motor by multiple ferromagnetic silicon steel sheets, where the ferromagnetic silicon steel sheets are provided with the multiple slots whose number is a multiple of 15, and the stator of the motor is formed by windings of the three phases, X, Y, and Z. Each phase includes 2 to 4 phase portions and each group has 5 slots. The rotor of the motor is made up of a plurality of arced magnets which are fixed orderly and equally along a ferromagnetic steel ring, and the radial direction of each arced magnet is opposite to that of the adjacent magnetic poles. An arced magnet represents a magnetic pole, and the number of the magnetic poles is a multiple of 14 or 16, such as for reducing the cogging torque of the motor.

WO 2012/017302, to Kamper/Stellenbosch University, teaches an electrical energy conversion system which is particularly suited for use in wind energy conversion systems. A pair of magnetically separated permanent magnet machines are linked by a freely rotating rotor housing permanent magnets. The first machine is typically a synchronous generator, and the second an induction generator. The synchronous generator has a stationary stator which is connectable to an electrical system such as an electricity grid, and the induction generator has a rotor which is connectable to a mechanical drive system such as a wind turbine.

Kamper, US 2013/0214541, teaches an electrical energy conversion system which is particularly suited for use in wind energy conversion systems. The system includes two magnetically separated permanent magnet machines linked by a freely rotating rotor housing permanent magnets. The first machine is typically a synchronous generator, and the second an induction generator. The synchronous generator has a stationary stator which is connectable to an electrical system such as an electricity grid, and the induction generator has a rotor which is connectable to a mechanical drive system such as, for example, a wind turbine.

Prucher, U.S. Pat. No. 8,247,943 teaches a radial gap motor/generator having a thin annular array of magnets mounted for rotation to a stator in a radially spaced relation to at least one thin annular induction structure fixed to a stationary stator may be air or liquid cooled. The motor has at least radial gap between a magnetic core and the array and may include multiple gaps and multiple annular induction structures to increase the overall power density of the system.

An example of a planetary geared motor and dynamo is shown in Mizushima, U.S. Pat. No. 8,084,912, and which includes provision of planetary gear dynamo for reducing inverse torque when the functioning in a generator mode. Palfai, 2013/0237361, teaches a planetary gear assembly including a ring gear configured for connection to a rotor of an electric motor when in a first position and configured for connection to a housing of the electric motor when in a second position. A sun gear is configured for connection to the housing when the ring gear is in the first position and configured for connection to the rotor when the ring gear is in the second position. A plurality of planet gears are configured to mesh with the ring gear and the sun gear.

Also referenced are the brush holder clip to commutator assemblies shown in each of connector for motors and generators provided in the form of an integral V-shaped spring steel member having an electrical connector extending one of the legs thereof and opposite an apex of the clip and connector. The housing containing the commutator has a slot therein through which the brush holder passes. The V-shaped clip and connector is inserted into the slot and wedged between the brush holder and an edge of the slot. The clip and connector is electrically conductive and communicative with the brush holder and is adapted for mating interconnection with a wire or other conductor.

SUMMARY OF THE PRESENT INVENTION

The present invention, while drawing from much the existing theory and teachings surrounding electrical motor and generator type conversion assemblies, in particular teaches an AC induction motor assembly for converting an electrical input to a mechanical or rotating work output. A related generator variant converts a rotating work input to a converted electrical output utilizing the same efficiencies achieved by the present design.

An outer annular arrayed component is rotatable in a first direction and an inner annular and concentrically arrayed component rotatable in a second opposite direction, the components being separated by an air gap. The magnetic elements are arranged in a circumferentially extending and inwardly facing array, the outer component having a rotatable shaft.

The inner component exhibits an outer facing end surface opposing the outer component and exhibiting a circumferentially array of coil sub-assemblies which are arranged in a further circumferentially extending and outwardly facing array opposing the inwardly facing magnets of the first array. The coil sub-assemblies each include a plurality of coils arranged about a platform support associated with an exterior facing circumferential location of the inner component. The coil subassemblies each further include a two stage configuration with each of horizontal and vertical extending portions arranged in interconnecting and overlapping fashion.

A plurality of stacked commutator segments are provided, each having a plurality of annular extending and individually insulated segments arranged in exteriorly facing manner, a similar plurality of brushes being established in an inwardly facing and continuous contacting fashion with the individual commutator segments.

The assembly operates in a first variant such that a current supplied to the components creates at least opposing magnetic fields in a desired phased or shifting manner resulting in relative rotation between the components resulting in a rotating work output delivered to the shaft. The assembly further operates in a second variant such that a rotating work input supplied to the shaft creates at least opposing magnetic fields between the annular components for creating an electrical current output through at least one of the commutator to brush interface or the plurality of coil subassemblies.

Additional features include a gear assembly including upper and lower tiers of reversing gears arranged between sets of circular teeth patterns defined in circular paths around an interior of the assembly. The gears include outwardly facing tiered or stacked patterns configured around the shaft, these opposing outer displaced and inwardly facing patterns associated with first and second tiered annular components counter rotated in response to a given rotational direction of the shaft.

Other features include a first of the annular components rotating the coil supporting component, with a second of the annular components rotating the commutator segments. The upper and lower tiers of reversing gears further exhibiting varying numbers of teeth for establishing any counter rotating speed ratio between the coil supporting component relative to the rotor driving component. The reversing gears can exhibit either of a straight or helical teeth pattern corresponding to the opposing and upper/lower tiered teeth patterns.

Additional features include provision of a spring biasing each of the brushes to maintain a continuous contact profile with the commutator segments. The outer annular component further includes a lower housing and the inner annular component an upper housing, the shaft being associated with the outer component extending through a central through aperture associated with the inner component and a fixed housing support structure for affixing the commutator segments. Each of the coils further includes a plurality of wires wound or braided together. In certain variants, at least one of the wires has a larger gauge as compared to one or more additional wire.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously described, the present invention relates generally to electrical generators and motors and, more specifically, discloses AC induction generator or motor assemblies for converting into an electrical output a rotating work input applied to a shaft (generator mode) or, alternatively, converting an electrical input applied to the coils and magnets to a rotating work output (motor mode). More specifically, the present invention discloses an electrical induction generator or motor exhibiting redesign stator and rotor components for optimizing either electrical output (generator) of the rotating input applied to the rotor shaft (generator) or, alternately, work output of the rotating shaft resulting from electrical (current) input.

Figure 6:
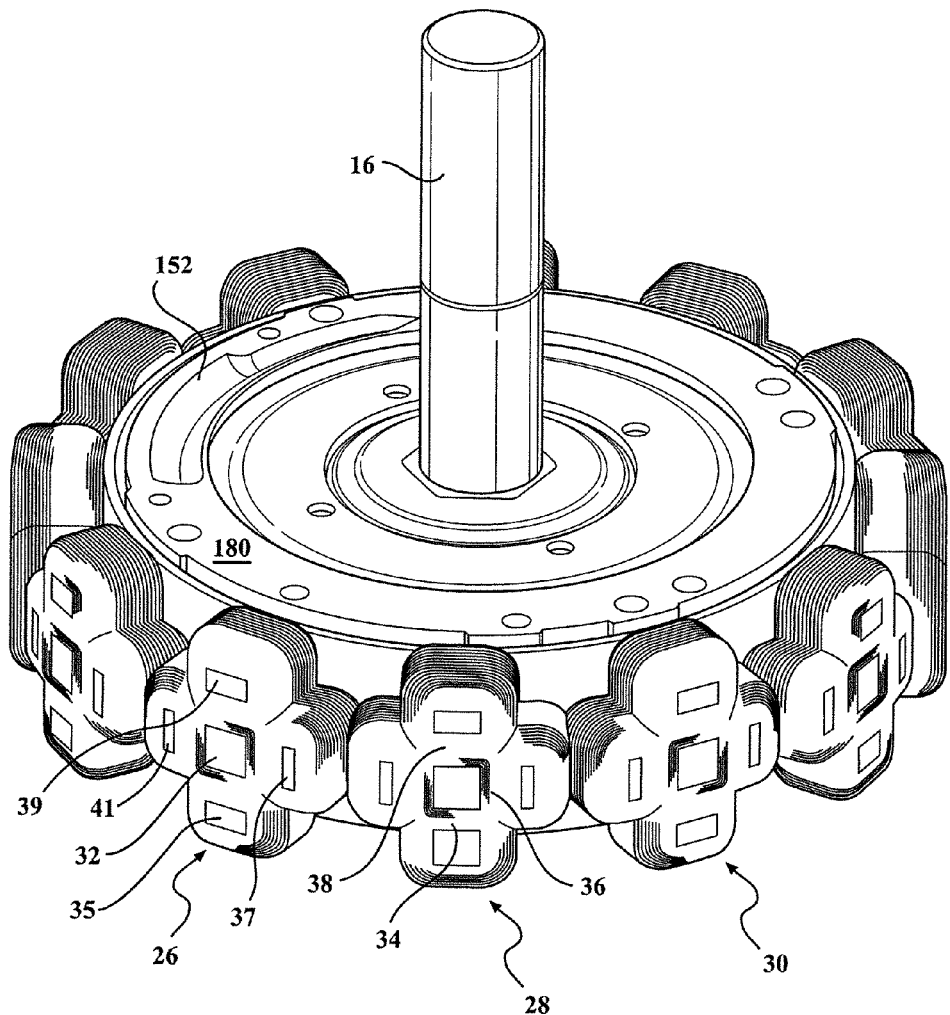
FIG. 6 is a perspective of the inner rotating component and gearbox housing and exhibiting individual multi-wire coils arranged in a plural circumferentially arrayed and non-limiting multi-stage configuration, the coil arrangements being supported in annularly outward arrayed fashion within exposed seating locations configured within insulating portions supported upon the outer annular face of the coil supporting component and, with the removal of the circumferential array of magnets associated with the outer coaxial rotating component, better illustrating the potential variations in coil geometry and braiding patterns associated with the inner concentrically arranged and opposing array of coil sub-assemblies, this further enhancing the performance characteristics of the assembly in either of motor or generator modes of operation.

Given the above background description, the present invention discloses an improved arrangement of induction style AC generators or electric motors, in which an outer coaxial and inner facing circumferential array of magnets is incorporated into a redesigned rotor and which is opposed by an inner coaxially positioned and outwardly facing circumferential array of multi-wire wound/braided coil subassemblies respectively incorporated into a redesigned stator. The redesigned aspects of the stator and rotor, in combination with the unique and novel aspects of the individually winding/braiding patterns of the multi-wire coil subassemblies (such as which are arranged in a multiple circumferentially arrayed and multi-stage driving fashion as best depicted in FIG. 6), results in either improved electrical generator output resulting from the configuration of the coils passing by the magnets, combined with the geared counter rotating of the coil supporting member relative to the magnet supported and coaxially arranged driving member described herein, so as to create an electrical charge or, in the alternate electrical motor variant, provides for an optimal work output of the rotor shaft in response to a given electrical input (to the two stage coils and counter rotating magnets) necessary for generating the opposing magnetic fields in the coaxially arrayed components supporting the coils and magnets in opposing and counter rotating fashion.

Additional novel aspects of the present inventions include the incorporation of varying gear assemblies, such incorporating a driving magnet supporting ring and a counter driven and coil supporting ring, these working in synergy with the counter driving and current generating magnetic fields established between the coils and magnets. In a first variant, a set of multi-tiered reversing gears are provided for establishing any desired counter rotating ratio between the meshing gear teeth of the magnet supported and coil supported rings. In a second variant, a set of helical gears can be substituted for providing more efficient counter rotation of the coil supporting gear in response to rotation of the magnet supported gear.

In either variant, the coil supporting gear ring can be driven at any speed, such as constant or in either of an accelerated or decelerated ratio relative to the gear ring supported upon the rotating magnet component. Any plurality of the multi-tiered or stacked gears can be supported in contacting fashion between the magnet and coil supporting rings (with again one or more of the reversing gears potentially exhibiting stacked gear sub-portions of varying configurations of offset ratio defining teeth and which are adjustable relative the magnet and coil supporting rings for counter rotating the coil supporting ring in a desired accelerating or decelerating fashion). In this manner, the effect of the gear assembly is to increase either the work output of the shaft in a motor configuration or the current generating and electrical output delivery capability of the armature in the generator configuration, this by assisting in the counter rotation of a coil segment supported and inner coaxial supporting component (traditionally the rotor) relative to the counter rotated and outer coaxial magnet supported component (traditionally the stator).

Figure 2:
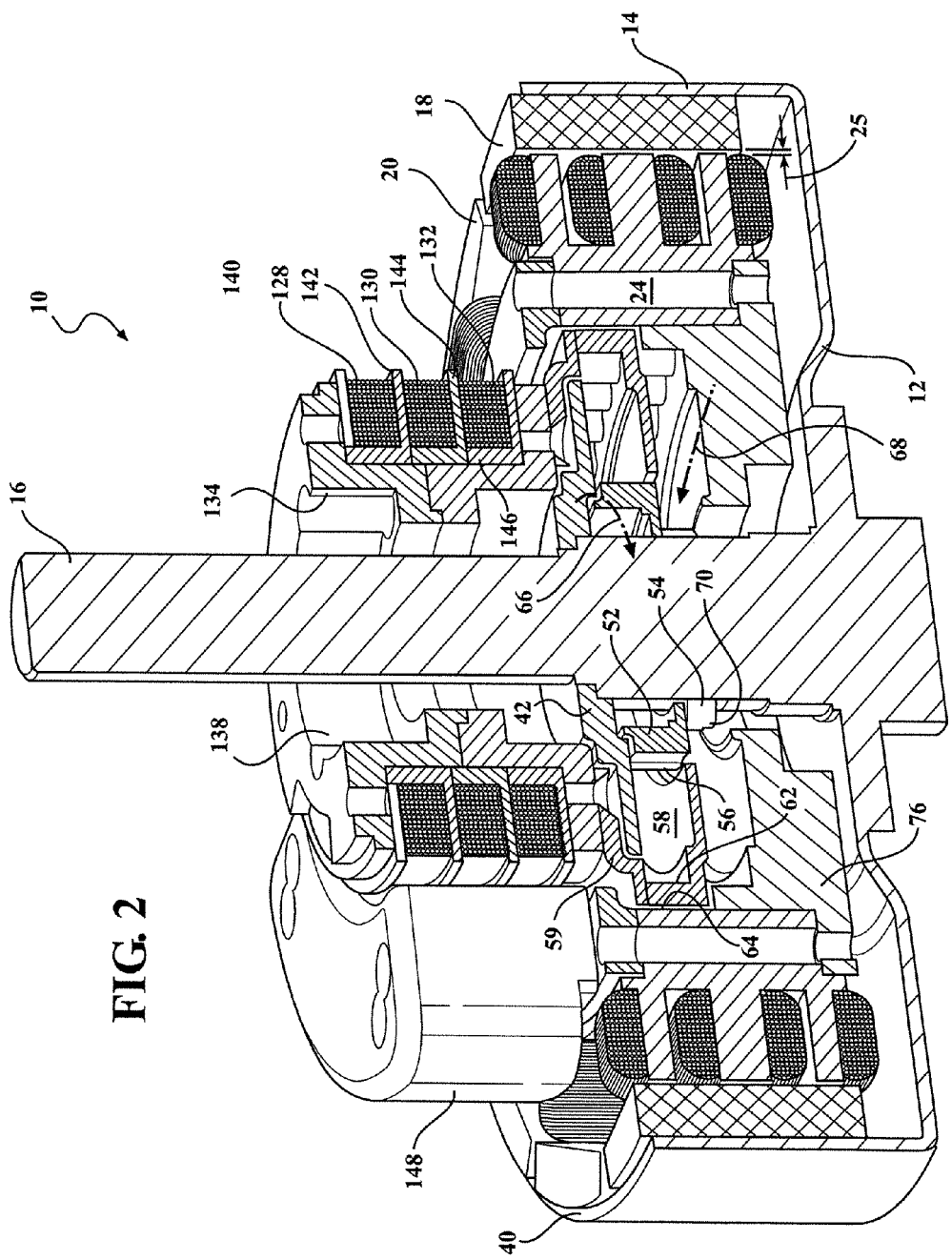
FIG. 2 is an assembly cutaway of either of the electric induction motor or generator and better illustrating one non-limiting arrangement of the outer and inner coaxial and counter rotating components along with multi-tiered reversing gears, as well as depicting an arrangement of annular supported and stacked commutator segments in contact with the surrounding and rotationally supported brushes associated with the present inventions.

With reference to the above description, and referring initially to the cutaway assembly views of FIG. 2, an AC induction electric generator or motor is generally shown at 10 in cutaway fashion. A housing for the assembly includes a reconfigured rotor component, which is exhibited by a circular shaped base 12 with an annular extending end wall 14. A rotatable power output shaft 16 extends upwardly from a center location of the base 12 and, in operation, interfaces with any type of work output component not limited to a gear associated with either a mechanical output or, alternately, any other rotating work input in an electrical generator output mode (such as not limited to a hydro, solar or wind powered input.

Figure 1:
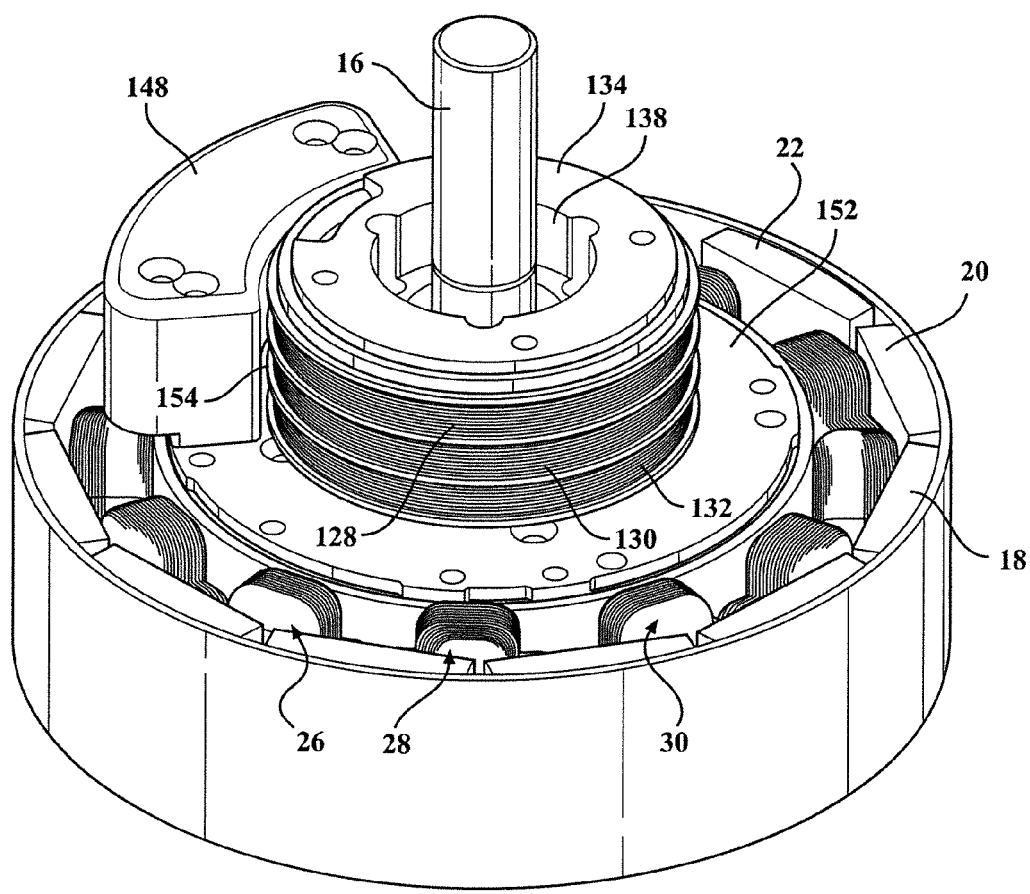
FIG. 1 is a perspective of the electrical generator or motor with the upper housing removed according to a non-limiting embodiment of the invention and which exhibits a plurality of circumferentially arranged and inwardly facing magnets associated with a shaft supporting and rotating component, in combination with an inner concentrically arranged and opposing array of individual coil sub-assemblies which are likewise arranged in plural and circumferential fashion about an inner coaxial rotating component which is driven in a direction opposite the outer rotating component, the generator or motor device further depicting an inner coaxial component supported and rotatable brush housing established in continual contact with a fixed interior array of annular stacked commutator segments for facilitating either of a rotating shaft work output motor configuration or a rotating shaft input with electrical current output generator configuration of the overall assembly and with increased efficiency.

A plurality of magnets 18, 20, 22, et. seq. (see as also shown in FIG. 1) are arranged in circumferential and inwardly facing fashion about the inner annular surface of the outer end wall 14 according to a first perimeter extending array. Aside from a three dimensional and pseudo-rectangular shape as best depicted in the illustrations, it is further understood that the magnets can be configured in any other shape or profile and can be provided with any variable of magnetic force or field configuration resulting from electrical current input.

A redesign of the (traditionally) stator component includes an interior supported and generally annular shaped structure 24 this being configured in an inner concentric extending arrangement relative to the outer concentric positioned (and inwardly facing) magnets 18, 20, 22 et seq. supported upon the outer wall 14 of the rotor. As best shown when viewed in combination with FIG. 6, a plurality of individual coil subassemblies are shown (twelve in the illustrated embodiment) arranged in circumferentially arrayed fashion about the annular coil supporting structure 24 and according to a second outwardly facing perimeter array which opposes the magnets of the first inwardly facing perimeter array by a selected gap (see at 25 in FIG. 2). The material construction of the inner and outer counter rotating components can include any metallic or other material, such as which can further include any suitable insulating components for ensuring localization of generated magnetic fields in the desired and intended fashion (e.g. commutator, armature brushes, etc.).

Referring again to FIG. 6, the coils can be (without limitation) arranged in a two stage or any other multi-stage configuration, this facilitating the work output generating in either the generator or motor modes and by virtue of assisting in enhanced magnetic field (and consequent) counter rotating generating capabilities in application with the outer rotary magnet supporting component. As shown, a support platform associated with each of the coil subassemblies, such as generally referenced at 26, 28, 30, et seq. in FIG. 6, exhibits (without limitation) a generally three dimensional overall shape which is constructed of an insulating material (see for example as further depicted at 32 as to coil subassembly 26) and which is configured for seating a plurality of arranged coils.

Referring still to FIG. 6, further selected coil sub-assembly 28, according to the non-limiting variant shown, exhibits a two stage configuration which is exhibited by an intersecting arrangement of horizontal and vertical interconnecting coils (see at 34, 36 and 38 et seq.). As further shown, overlap locations are established between the interconnecting coils which can be wired together in any of vertical and horizontal or integrated fashion, as shown in which the individual coils overlap both horizontally and vertically so that they are separated by selected insulating locations, again at 32 as well as further shown at 35, 37, 39 and 41 in FIG. 6. Alternatively, the coils can be wired separately and (inter) connected in any combination in circumferential formed fashion about the coil supporting structure 24.

One aspect of the present invention contemplates each individual coil (e.g. as previously shown in concentrically arrayed fashion at 26, 28 and 30 and which include elongated braided wires) exhibiting any multi-wire braiding or winding pattern, the number of wires, configuration of the windings and the like being further understood to contribute to the creation of a desired magnetic field produced profile in the stator-like inner rotatable and wire supporting component which, in combination with the fixed or variable fields generated in the outer concentrically arranged magnets 18, 20, 22 et seq., contributes to the driving of the inner concentric component 24 and counter rotating driving of the outer component magnet supporting component, again at 12 and 14 with shaft 16, in a maximum efficient manner.

Without limitation, pluralities of three, five or other wire configurations can be provided for each wound or braided coil, with the gauge or diameter of any one or more given wires being larger than for associated inter-braided wires. Selected coil winding patterns are also depicted at 43 in the cutaway view of FIG. 2. Additional to the previously described, it is again contemplated that the individual coils can be wired together in any other combination beyond that shown and it is also envisioned that any arrangement of coils can be combined into a single or multiple coil pattern or any other pattern of coil windings in order to establish a desired interacting current generated magnetic field in concert with the opposing fields associated with the magnets 18, 20, 22 et seq.

Such alternate coil winding patterns can include the individual two stage coil subassemblies patterned in any of inner to outer, outer to inner, and inner to outer integrated patterns. As further previously stated, and apart from having the coils wired separately around the inner concentric component 24 or in any other combination such as previously indicated, it is also envisioned that the coils can be wired in other multiple (such as three) stage fashion for optimizing the counter magnetic field rotating aspects of both the outer concentric magnet supporting component and the inner coil supporting component.

Referring again to FIGS. 1-2, and although not shown, a stationary component of an outer housing of the assembly is provided for enclosing the assembly and typically includes an upper and annular outwardly extending top surface which communicates with an intermediate outer annular and curved or other suitably configured location and which further terminates in an outermost annular rim exhibiting a downward defined rim edge arranged in close and upwardly spaced proximity to an upper rim edge 40 associated with annular end wall 14 of the outer magnetic supporting wall 14. Also not shown but understood to be included can be heat dissipation slots or other suitable aperture or ribbed structures formed in the top of the fixed housing and, along with any other configuration of tab, slot or bracket, facilitates mounting of the housing to any environmentally situated location. The fixed and anchored housing portions are understood to be stationary relative to the coaxial members 12 and 24 which, as will be further described, counter rotate relative to one another.

As further previously described, the present assembly design differs from the prior art in that the coil supporting (traditionally stator) component, as again depicted by annular structure 24 with supported coil winding patterns 26, 28, 30 et seq., is configured to rotate in a counter or opposite direction to the rotational direction of the magnetically supported outer coaxial housing with annular configured end wall 14, and according to a desired separation (or air gap) between counter-revolving components. The material construction of the various stator and rotor components can include any metallic or other material, such as which can further include any suitable insulating components for ensuring localization of generated magnetic fields in the desired and intended fashion (e.g. commutator, armature brushes, etc.).

Figure 3:
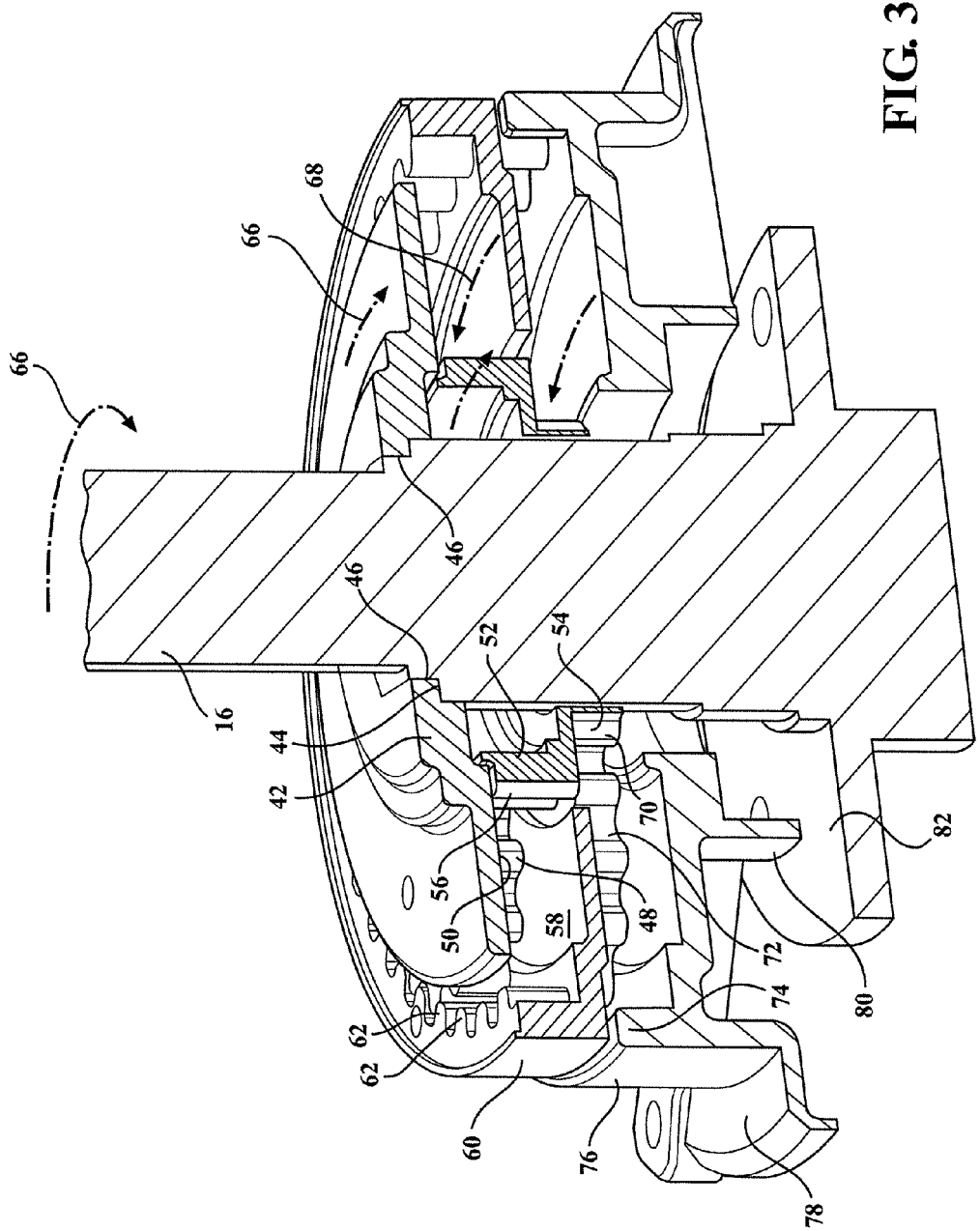
FIGS. 3 and 4 are each perspective views of variants of counter driving gear subassemblies, each exhibiting oppositely driven rotor supported exterior teeth and opposing commutator supported and coil supported members which are arranged, in combination with a two tiered arrangement of reversing gears, to establish any type of offset ratio or accelerated or decelerated operating speed as established by stacked sub-portions of teeth associated with a subset number of reversing gears, this structural counter rotating relationship occcurring alone or in combination with the magnetic driving fields created between the magnet and coil supported turning components in order to increase work output (i.e. either enhanced rotation of the shaft in an electric motor mode or increased current output via the brush contacting armature in an electric generator mode)

With reference to each of FIGS. 2-3, a sectional perspectives are provided of a first variant of a gear assembly for converting a rotating input of the magnet supporting component (regardless of whether resulting from an external power input to the shaft 16 or a reverse power output resulting from the current generated magnetic fields between the stator (magnets) and rotor (coils). An upper most annular (covering) member 42 exhibits a generally flattened disk shape with an inner annular surface having an inwardly facing and stepped profile, further at 44, which seats or is otherwise fixedly secured upon an exteriorly facing profile 46 (see as best shown in FIG. 3) associated with an intermediate annular location of the rotor 16. Without limitation, the uppermost annular member 42 can also be integrally formed with the rotor.

As shown in FIG. 3, an upper tier arrangement of reversing gears can be provided, one of which is partially evident as depicted at 48. The reversing gears 48 can be supported about an axis extending from an underside of the annular member 42 or, in other variants, could conceivably be allowed to circumferentially travel during rotation about a track defined by the upper tiered arrangement of the gear assembly. As further shown, the gears 48 are guided in part by a smooth underside 50 of the uppermost annular rotating member 42, this in combination with an underneath located and reduced diameter annular member 52 further including an inner most vertically extending support portion 54 which is likewise anchored to the exterior of the rotor 16 at a location proximate and underneath the uppermost annular member 42.

As further shown, the annular member 52 exhibits a toothed exterior pattern 56 which meshly engages selected rotary exhibited teeth associated with each of the upper tiered reversing gears 48. An outer concentric arrayed annular disk member is further exhibited by surface 58 terminating in an outer annular wall 60, a plurality of additional teeth 62 being arrayed on an inner surface of the outer wall 60 and which, in combination with the teeth 56 associated with the inner opposing annular member 52, define a circular track within which the upper tier reversing gears 48 are rotationally displaced.

As further best depicted in FIG. 2, and depending upon the structural variant employed the outer disk member 58 can be configured either to be separately rotated relative to or anchored with an inner annular surface 64 of the coil supporting structure 24. In the instance of a spacing existing between the outer annular wall 60 and the opposing inner annular surface of the coil supporting structure 24, the outer disk member 58 can be structured to support an upper and annular lip extending portion 59, see as best shown in FIG. 2, and which in turn supports the stacked plurality of commutator segments (described further below) in clockwise rotating fashion about the rotor shaft 16. In this fashion, and upon rotation of the rotor 16, the covering member 42 and annular member 52 are rotated in the clockwise direction referenced by arrows 66, with the gears 48 rotating along the inside meshing profiles of the opposing teeth 56 and 62 in a manner which drives the outer disk member 58 in a reverse and counter clockwise direction (arrow 68).

As further shown, the downward extending portion 54 of the inner annular member 52 fixed to the rotary shaft 16 further exhibits an outer pattern of teeth 70 defining an outer facing circumferential plurality associated with a lower tiered arrangement of reversing gears, see further at 72. Compared to the upper tiered gears 48, the lower tier gears 72 are larger in diameter and are guided between the inner rotor supported and outwardly arrayed teeth 70 and a further plurality of outer radially arrayed and inwardly annularly facing teeth 74 associated with a lower coil supporting annular member 76.

The present invention further contemplates that the upper tier teeth 56 and lower tier teeth 70 of the rotor support annular member 52 rotate in unison, however the toothed patterns (specifically the number and spacing of the teeth) can be varied along with that of each of the upper tier gears 48 and lower tier gears 72 and the outer annular arrays of teeth 62 (opposing inner teeth 56 and guiding upper gears 48) and further at 74 (opposing lower tiered inner teeth 54 and guiding lower gears 72). The lower tier arrangement of gears 72 likewise influence the lower coil supporting annular member 76 to rotate in the counter clockwise fashion (at 68)

previously referenced in regards to the intermediate arranged outer disk member 58.

By virtue of this arrangement, the respective gearing and teeth arrangements can be configured to cause the annular commutator supporting component 60 and coil supporting component 76 to rotate in similar directions but perhaps at different speeds. As further best referenced in FIG. 3, the lower most positioned annular member 76 is configured to include an outer bottom ledge 78 which, in combination with its outer annular surface, provides a mounting location for receiving the coil supporting and ring shaped structural array 24. A lower reinforcing and annular projecting portion 80 also extends from an underside of the lowermost member 76 and is spaced a distance upwardly from an opposing and lowermost annular support location 82 associated with the rotor construction.

Without limitation, any gearing ratio can be integrated into the respective meshing interfaces established between the array of reversing gears and their respective relationships with each of the magnet and coil rings. It is also envisioned that any other number of reversing gears, down to one, can be employed in other variants of the assembly. It is additionally envisioned that other counter-rotating structure can be incorporated into the interface between the magnet and coil rings, this also contemplating other direct drive structure for establishing a fixed or varying turning ration between the rings in synchronicity with the rotating forces associated with the current generated magnetic fields in the magnets and coils.

Figure 4:
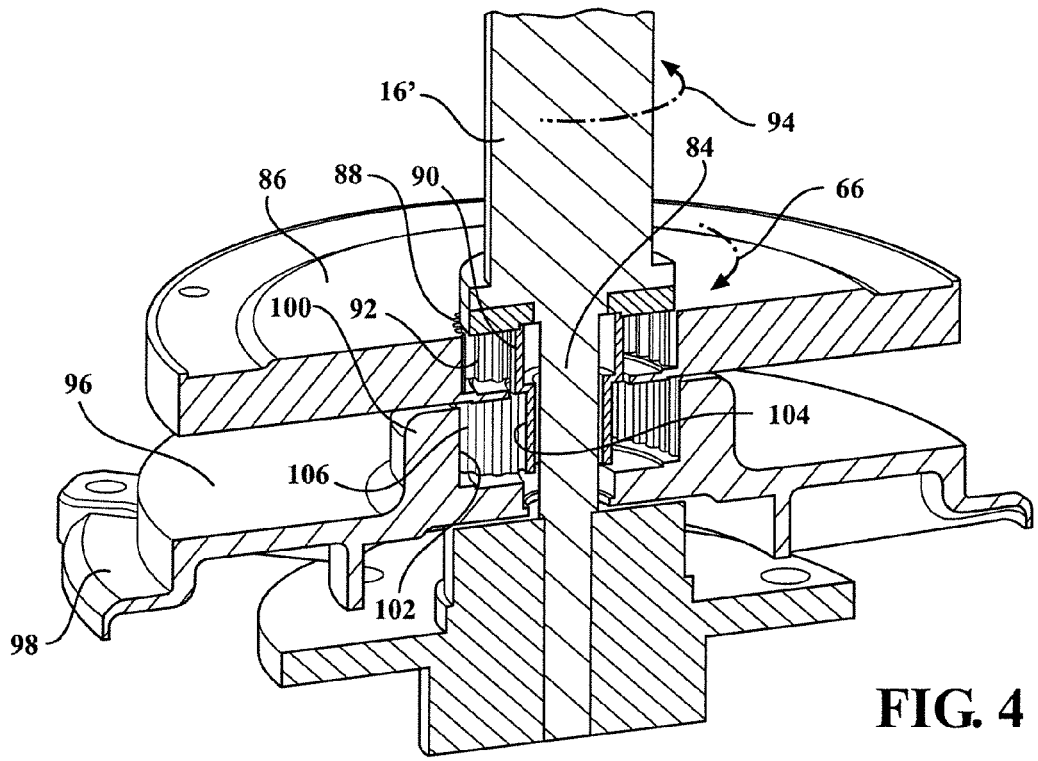

FIG. 4 illustrates a perspective view of a further variant of counter driving gear subassembly, similar in numerous respects to that shown in FIG. 3, and in which a reconfiguration of the rotor 16' is depicted in cutaway along with a redesign of the upper and lower tiers of gears which can be positioned in close proximity to an inner extending and reduced diameter portion (at 84) of the shaft. Specifically, an upper annular member 86 is supported in encircling fashion about the shaft 84 and exhibits an inner facing array of teeth 88 which oppose an outer facing array of teeth 90 which surround and are mounted to the shaft portion 84. An upper tier of teethed gears, see as shown in representative fashion at 92, are guidably and rotatably supported between the opposing arrays 88 and 90 of teeth such that the rotation of the rotor (depicted by arrow 94), results in counter rotation of the upper member 86 in the direction of arrow 66.

A modification of the coil supporting component 96 is depicted and which is constructed to again include an outer ledge 98 for supporting the coil ring and structure 24. The coil supporting component 96 further exhibits an inner radially spaced and intermediate located annular upward projection, see at 100, which includes an inner facing teethed array 102, this opposing a further outer teethed array 104 associated with the reduced diameter portion 84 of the rotor and which is located below the upper teeth 90. A lower tier arrangement of gears, see at 106, are provided in the annular channel established between the opposing patterns of teeth 102 and104 and, as with the upper tier arrangement depicted by gear or gears 92, provides for synchronized or offset rotation (such as at any accelerated, decelerated or otherwise variably offset speed) of the upper component 86 (such as supporting the commutator stack shown in FIG. 2) relative to the lower coil stack and structure (24) supporting component 96.

Figure 5:
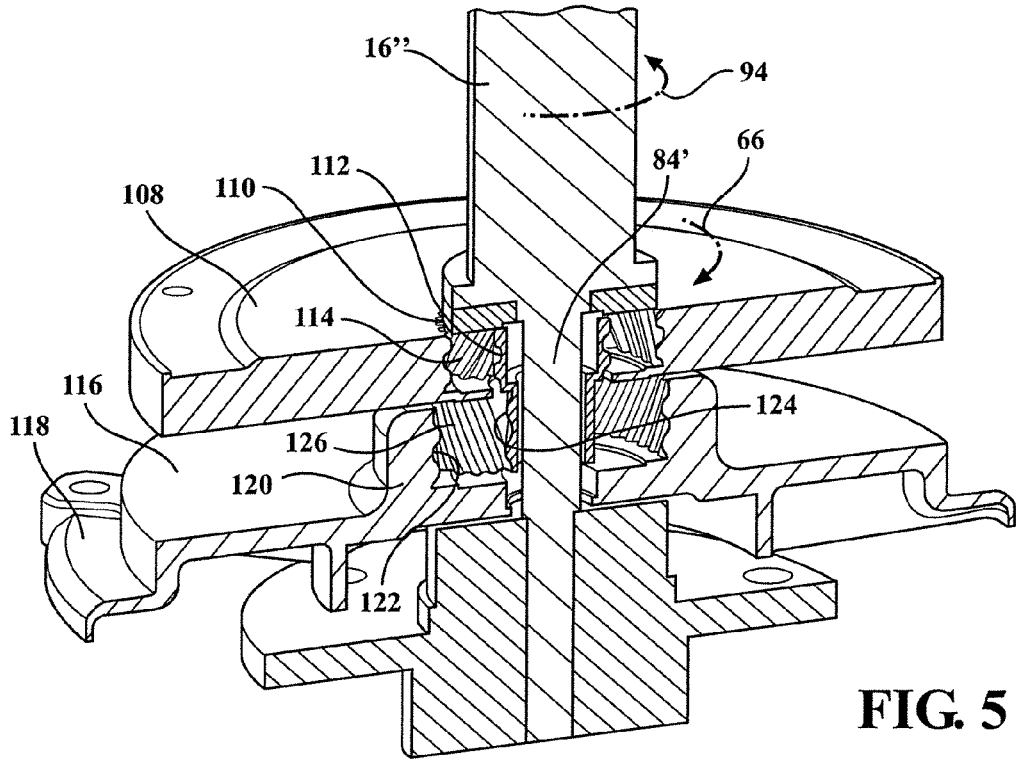
FIG. 5 is a yet further perspective similar that that depicted in FIG. 4 and which substitutes the straight gear teeth pattern with a set of helical reversing gears with multi-tiered and reversing winding patterns for counter driving/rotating the coil supporting gear component in response to rotation of the rotor and magnet array supported and tiered rotating teeth components.

Referring to FIG. 5, a further perspective similar that that depicted in FIG. 4 and which again discloses another variant of counter driving gear subassembly, in which a further reconfiguration of the rotor 16" is depicted in cutaway along with a redesign of the upper and lower tiers of helical wound gears which can be positioned in close proximity to an inner extending and reduced diameter portion (depicted at 84' in comparison to that previously shown at 84 in FIG. 4) of the shaft. Similar to the structure described in reference to FIG. 4, an upper annular member 108 is supported in encircling fashion about the shaft portion 84' and exhibits an inner facing array of teeth 110 of helically wound teeth which oppose an outer facing array of teeth 112 which surround and are mounted to the shaft portion 84'. An upper tier of helical teethed gears, see as shown in representative fashion at 114, are guidably and rotatably supported between the opposing arrays 110 and 112 of teeth such that the rotation of the rotor (as also depicted in FIG. 4 by arrow 94), results in counter rotation of the upper member 108 in the direction of arrow 66.

A further modification of the coil supporting component 116 is depicted and which is constructed to again include an outer ledge 118 for supporting the coil ring and structure 24. The coil supporting component 116 further exhibits an inner radially spaced and intermediate located annular upward projection, see at 120, which includes an inner facing helical teethed array 122, this opposing a further outer teethed array 124 associated with the reduced diameter portion 84' of the rotor and which is located below the upper teeth 112. A lower tier arrangement of helical gears, see as represented by gear 126, are provided in the annular channel established between the opposing patterns of teeth 122 and124 and, as with the upper tier arrangement depicted by gear or gears 114, provides for synchronized or offset rotation (such as at any accelerated, decelerated or otherwise variably offset speed) of the upper component 108 (such as again supporting the commutator stack shown in FIG. 2) relative to the lower coil stack and structure (24) supporting component 116.

The substitution of the helical gear arrangement of FIG. 5 is further understood to increase the operational efficiency of the assembly and to further assist in the variable speed properties of the counter-rotating magnet and coil supporting components, as well as the rotation of the commutators.

With reference again to the preceding background description regarding conventional brush and commutator arrangements, the present invention incorporates a plurality of commutator segments, see at 128, 130 and 132 (see also FIGS. 1-2), which are anchored to the exterior surface of a pair of stacked structural (stationary) components 134 and 136 defining a channeled interior, see also inner annular surface 138, within which the rotor shaft 16 turns. Consistent with prior descriptions, the individual commutator segments are arranged individual annular recessed pockets defined in a suitable insulating material portions 140, 142, 144 and 146 and so as to be insulated from each other as well as the inner concentrically arranged and rotating shaft.

In the variant depicted, the stacked array of commutator segments 128, 130 and 132 are supported upon the annular rotating portion 59 and, as such, respond to the driving motion of the rotor shaft as previously described in order to rotated as dictated by the rotation of the upper tier annular component 60. Contrasting both the present and the prior art descriptions, it is also envisioned that the commutator segments can be reconfigured to be stationary during counter rotation of the motor and coil supporting components in the present description.

A brush housing 148 is provided and exhibits a three dimensional and interiorly configured body which is anchored upon an upper surface of an outermost arcuate ledge forming a portion of a circular shaped top cover plate 150 (see also FIG. 6) which is in turn seated upon coil support structure 24, such that the housing 148 also rotates in a counter direction relative to the commutator segments. As best shown in FIG. 6, a curved recess profile 152 is configured into the upper surface of the plate for defining a mounting location for mating with a likewise underside projecting profile associated with the brush housing 148 (not shown) for mounting the same atop the assembly. It is also envisioned that the assembly can be reconfigured so that either of the brush housing or commutators are stationary or, alternatively, either can be modified to rotate at speed relative to the other being stationary or counter-rotated at a different speed.

Although not shown, a plurality of brushes equal to the number of commutator segments are incorporated into the brush housing and are configured such that an inner facing contact surface is provided in contact with each commutator segment (partial reference to a selected brush is shown at 154 in FIG. 1). Any number of springs, such as equal to the number of brushes, can further be incorporated into the brush housing so that, in response to centrifugal generated forces resulting from higher speed rotations of the brush housing, the biasing forces exerted by the springs assist in maintaining a continuous contact profile between the brush and commutator segments and so as to deliver a consistent armature current in either a work input (motor) or electrical output (generator) mode.

The individual wiring arrangements of the coils, in combination with the fixed commutator and rotating outer brush, are further engineered to maximize the generation and application of magnetic fields in coils, these interfacing with the opposing magnetic field profile generated by the magnetic elements 18, 20, 22 et seq. in order to generate the driving forces explained in the previous analysis and in order to maximize the driving efficiency of the outer annular supported rotor component relative to the inner and counter rotating coil supporting component in an electric motor application. In the alternate generator application, the efficiencies released by the braiding of the multiple wire armature coil subassemblies results in both enhanced electromagnetic induction generated (EMF) forces resulting from the reversing fields created between the stator and rotor, along with superior collection of the electrical charge created between the coil subassemblies and magnets, further again as a result of the external powered rotating shaft, and which are delivered via the continuous contact profile maintained between the commutator segments 128, 130 and 132 and their corresponding and underside spring biased contacting brushes.

Without limitation, the novel aspects of the magnetic generator or motor configurations depicted herein include but are not limited to the individual coil winding patterns (such as again which can include any plurality of individually braided wires of similar or varying gauge not limited to examples of the three, five or other pluralities of interbraided wiring patterns). Furthermore, the concentric and counter-driving arrangement of the inner coaxial coil supporting ring and outer coaxial magnetic component supporting ring is further understood to contribute, along with the coil winding geometries, to the efficiency of the AC magnetic induction motor or generator arrangements.

Notably, the present invention contemplates the various co-rotating or counter rotating components depicted throughout FIGS. 2-5 operating in synchronicity with the magnetic fields generated between the coils and magnets in order to enhance the work output established by either the rotating shaft 16 in a motor variant or the current output delivered through an armature (not shown) associated with the brush housing in a generator variant. In this manner, the physical rotation work output or electrical current generating capabilities of the assembly can be increased (up to double) in certain variants. It is also understood and envisioned that other reconfigurations of the outer and inner coaxially arrayed components are contemplated and which will retain or enhance the efficiency of the design.

Having described my invention, other and additional preferred embodiments will become apparent to those skilled in the art to which it pertains, and without deviating from the scope of the appended claims.

I claim:

1. An electromagnet assembly for operating in either of a rotating work or electrical output mode, comprising:
   an outer annular arrayed component rotatable in a first direction and an inner annular and concentrically arrayed component rotatable in a second opposite direction, said components separated by an air gap;
   said outer component exhibiting an annular end surface supporting a plurality of magnetic elements in a circumferentially extending array, said outer component having a rotatable shaft;
   a gear assembly having:
      an upper annular member supported about said rotatable shaft, said upper annular member having an aperture with an inwardly facing array of teeth,
      a first set of outwardly facing array of teeth surrounding and mounted to said rotatable shaft which oppose said inwardly facing array of teeth of said upper annular member,
      one or more upper tier gears seated within an annular space between said first set of outwardly facing array of teeth and said inwardly facing array of teeth, said one or more upper tier gears having teeth configured to inter-engage with said inwardly facing array of teeth of said upper annular member and said first set of outwardly facing array of teeth surrounding and mounted to said rotatable shaft such that said upper annular member counter rotates with respect to said rotatable shaft,
      a lower annular member supported about said rotatable shaft, said lower annular member having an aperture with an inwardly facing array of teeth,
      a second set of outwardly facing array of teeth surrounding and mounted to said rotatable shaft which oppose said inwardly facing array of teeth of said lower annular member, and
      one or more lower tier gears seated within an annular space between said second set of outwardly facing array of teeth and said inwardly facing array of teeth, said one or more lower tier gears having teeth configured to inter-engage with said inwardly facing array of teeth of said lower annular member and said second set of outwardly facing array of teeth surrounding and mounted to said rotatable shaft such that said lower annular member counter rotates with respect to said rotatable shaft and said upper annular member rotates in a direction corresponding to said lower annular member;
   said inner component exhibiting an outer facing end surface opposing said outer component and exhibiting a circumferentially array of at least one coil sub-assembly;
   said array of at least one coil sub-assembly each including a plurality of coils arranged about a platform support associated with an exterior facing circumferential location of said inner component, said array of at least one coil sub-assembly each further including a two stage configuration with each of horizontal and vertical extending portions arranged in interconnecting and overlapping fashion;

a plurality of stacked commutator segments having a plurality of annular extending and individually insulated segments arranged in exteriorly facing manner, a similar plurality of brushes established in an inwardly facing and continuous contacting fashion with said individual commutator segments;

said electromagnet assembly operating in a first variant such that a current supplied to said components creating at least opposing magnetic fields in a desired phased or shifting manner resulting in relative rotation between said components resulting in a rotating work output delivered to said shaft; and said electromagnet assembly operating in a second variant such that a rotating work input supplied to said shaft creating at least opposing magnetic fields between said annular components for creating an electrical current output through said commutator to brush interface.

2. The invention as described in claim 1, further comprising a first of said annular components rotating said coil supporting component.

3. The invention as described in claim 2, further comprising a spring biasing each of said plurality of brushes to maintain a continuous contact profile with said commutator segments.

4. The invention as described in claim 1, further comprising a second of said annular components rotating said commutator segments.

5. The invention as described in claim 1, further comprising said upper and lower tiers of reversing gears exhibiting varying numbers of teeth for establishing any counter rotating speed ratio between said coil supporting component relative to said rotor driving component.

6. The invention as described in claim 1, further comprising said reversing gears exhibiting either of a straight or helical teeth pattern corresponding to said opposing and upper/lower tiered teeth patterns.

7. The invention as described in claim 1, said outer annular component further comprising a lower housing and said inner annular component an upper housing, said shaft associated with said outer component extending through a central through aperture associated with said inner component and fixed housing support structure for affixing said commutator segments.

8. The invention as described in claim 1, each of said coils further comprising a plurality of wires wound or braided together.

9. The invention as described in claim 1, at least one of said wires having a larger gauge as compared to one or more additional wire.

10. An electric motor, comprising:

an outer annular arrayed component rotatable in a first direction and an inner annular and concentrically arrayed component rotatable in a second opposite direction, said components separated by an air gap;

said outer component exhibiting an annular end surface supporting a plurality of magnetic elements in a circumferentially extending array, said outer component having a rotatable shaft;

a gear assembly having:

an upper annular member supported about said rotatable shaft, said upper annular member having an aperture with an inwardly facing array of teeth, a first set of outwardly facing array of teeth surrounding and mounted to said rotatable shaft which oppose said inwardly facing array of teeth of said upper annular member, one or more upper tier gears seated within an annular space between said first set of outwardly facing array of teeth and said inwardly facing array of teeth, said one or more upper tier gears having teeth configured to inter-engage with said inwardly facing array of teeth of said upper annular member and said first set of outwardly facing array of teeth surrounding and mounted to said rotatable shaft such that said upper annular member counter rotates with respect to said rotatable shaft, a lower annular member supported about said rotatable shaft, said lower annular member having an aperture with an inwardly facing array of teeth, a second set of outwardly facing array of teeth surrounding and mounted to said rotatable shaft which oppose said inwardly facing array of teeth of said lower annular member, and one or more lower tier gears seated within an annular space between said second set of outwardly facing array of teeth and said inwardly facing array of teeth, said one or more lower tier gears having teeth configured to inter-engage with said inwardly facing array of teeth of said lower annular member and said second set of outwardly facing array of teeth surrounding and mounted to said rotatable shaft such that said lower annular member counter rotates with respect to said rotatable shaft and said upper annular member rotates in a direction corresponding to said lower annular member;

said inner component exhibiting an outer facing end surface opposing said outer component and exhibiting a circumferentially array of at least one coil sub-assembly;

said array of at least one coil sub-assembly each including a plurality of coils arranged about a platform support associated with an exterior facing circumferential location of said inner component, said array of at least one coil sub-assembly each further including a two stage configuration with each of horizontal and vertical extending portions arranged in interconnecting and overlapping fashion;

a plurality of stacked commutator segments having a plurality of annular extending and individually insulated segments arranged in exteriorly facing manner, a similar plurality of brushes established in an inwardly facing and continuous contacting fashion with said individual commutator segments; and said assembly operating such that a current supplied to said components creating at least opposing magnetic fields in a desired phased or shifting manner resulting in relative rotation between said components resulting in a rotating work output delivered to said shaft.

11. The invention as described in claim 10, further comprising said upper and lower tiers of reversing gears exhibiting varying numbers of teeth for establishing any counter rotating speed ratio between said coil supporting component relative to said rotor driving component.

12. The invention as described in claim 10, further comprising said reversing gears exhibiting either of a straight or helical teeth pattern corresponding to said opposing and upper/lower tiered teeth patterns.

13. The invention as described in claim 10, further comprising a spring biasing each of said plurality of brushes to maintain a continuous contact profile with said commutator segments.

14. An electric generator, comprising:
- an outer annular arrayed component rotatable in a first direction and an inner annular and concentrically arrayed component rotatable in a second opposite direction, said components separated by an air gap;
- said outer component exhibiting an annular end surface supporting a plurality of magnetic elements in a circumferentially extending array, said outer component having a rotatable shaft;
- a gear assembly having:
  - an upper annular member supported about said rotatable shaft, said upper annular member having an aperture with an inwardly facing array of teeth,
  - a first set of outwardly facing array of teeth surrounding and mounted to said rotatable shaft which oppose said inwardly facing array of teeth of said upper annular member,
  - one or more upper tier gears seated within an annular space between said first set of outwardly facing array of teeth and said inwardly facing array of teeth, said one or more upper tier gears having teeth configured to inter-engage with said inwardly facing array of teeth of said upper annular member and said first set of outwardly facing array of teeth surrounding and mounted to said rotatable shaft such that said upper annular member counter rotates with respect to said rotatable shaft,
  - a lower annular member supported about said rotatable shaft, said lower annular member having an aperture with an inwardly facing array of teeth,
  - a second set of outwardly facing array of teeth surrounding and mounted to said rotatable shaft which oppose said inwardly facing array of teeth of said lower annular member, and
  - one or more lower tier gears seated within an annular space between said second set of outwardly facing array of teeth and said inwardly facing array of teeth, said one or more lower tier gears having teeth configured to inter-engage with said inwardly facing array of teeth of said lower annular member and said second set of outwardly facing array of teeth surrounding and mounted to said rotatable shaft such that said lower annular member counter rotates with respect to said rotatable shaft and said upper annular member rotates in a direction corresponding to said lower annular member;
- said inner component exhibiting an outer facing end surface opposing said outer component and exhibiting a circumferentially array of at least one coil sub-assembly;
- said array of at least one coil sub-assembly each including a plurality of coils arranged about a platform support associated with an exterior facing circumferential location of said inner component, said array of at least one coil sub-assembly each further including a two stage configuration with each of horizontal and vertical extending portions arranged in interconnecting and overlapping fashion;
- a plurality of stacked commutator segments having a plurality of annular extending and individually insulated segments arranged in exteriorly facing manner, a similar plurality of brushes established in an inwardly facing and continuous contacting fashion with said individual commutator segments; and
- said assembly operating such that a rotating work input supplied to said shaft creating at least opposing magnetic fields between said annular components for creating an electrical current output through at least one of said array of at least one coil sub-assembly and said commutator to brush interface.

15. The invention as described in claim 14, further comprising said upper and lower tiers of reversing gears exhibiting varying numbers of teeth for establishing any counter rotating speed ratio between said coil supporting component relative to said rotor driving component.

16. The invention as described in claim 14, further comprising said reversing gears exhibiting either of a straight or helical teeth pattern corresponding to said opposing and upper/lower tiered teeth patterns.

17. The invention as described in claim 14, further comprising a spring biasing each of said plurality of brushes to maintain a continuous contact profile with said commutator segments.

* * * * *